June 26, 1962      J. DOEBELI      3,040,495
FILTERING MEANS
Filed May 16, 1960
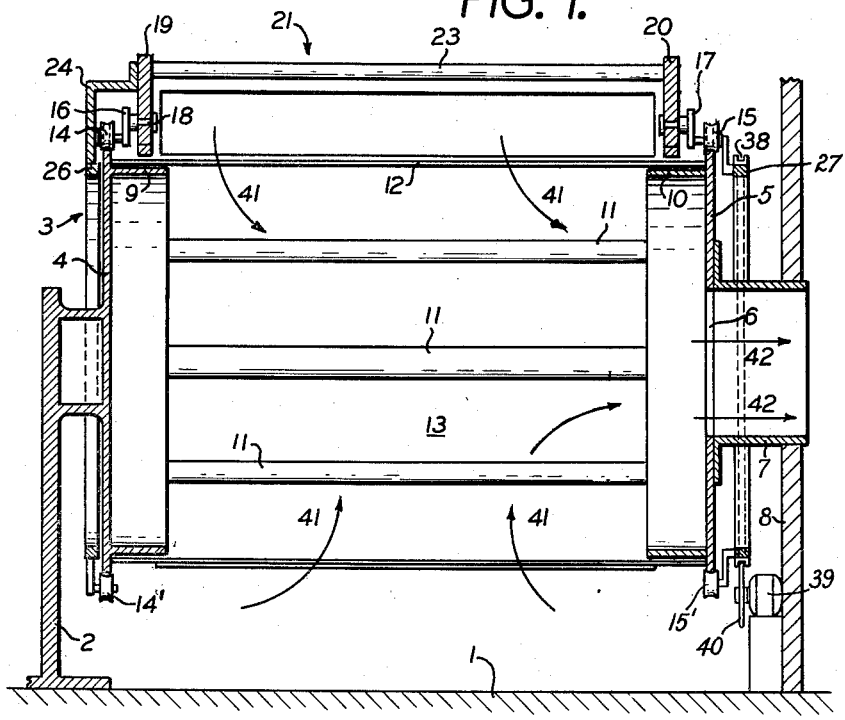
FIG. 1.
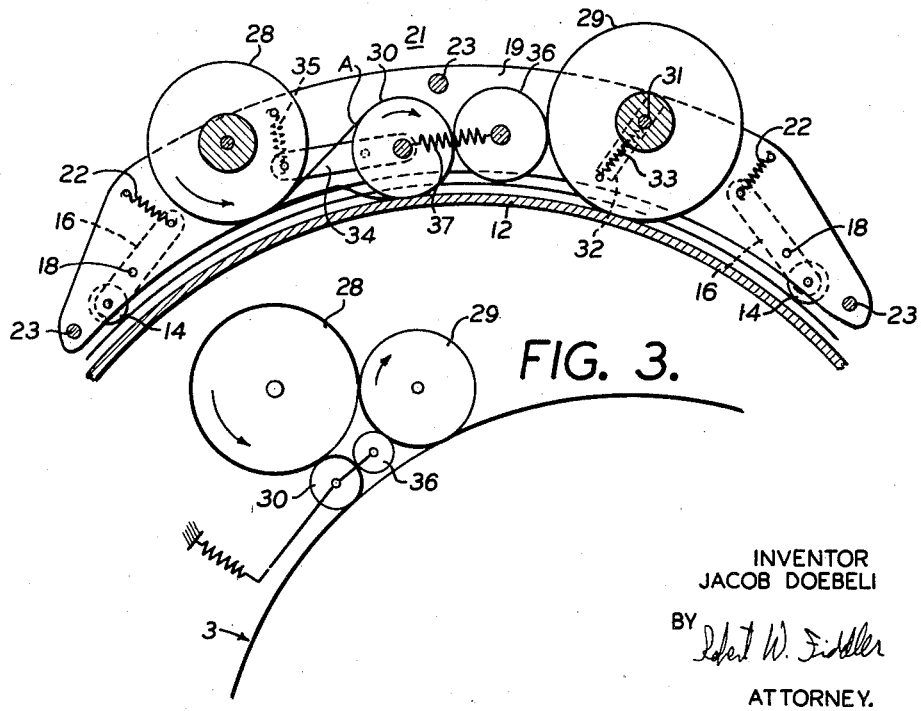
FIG. 2.
FIG. 3.
INVENTOR
JACOB DOEBELI
BY *[signature]*
ATTORNEY.

United States Patent Office 3,040,495
Patented June 26, 1962

3,040,495
FILTERING MEANS
Jacob Doebeli, Winterthur, Switzerland, assignor to Luwa Ltd., Zurich, Switzerland
Filed May 16, 1960, Ser. No. 29,479
17 Claims. (Cl. 55—97)

This invention relates to filtering means, more particularly to filtering means embodied in so called drum filters for the purification of gaseous media.

The removal of foreign particles or other undesired elements, from gaseous media is required in many situations. Particular need for filtration, in order to effect this removal of undesired elements, occurs in connection with the purification of air for air conditioning purposes, or for a variety of production operations. So called drum filters have in the past been utilized to effect the desired air filtration. These drum filters generally comprise a cylindrical member having foraminous walls over which a filtering medium such as filter paper or the like is supported. An outlet from the drum permits passage of the filtered air entering the drum through the filtering medium via the foraminous walls to be delivered to any selected delivery point. Problems arise in conjunction with the mounting of the filtering medium with respect to the drum due to the need for periodic replacement of the filtering medium. It is desirable that the filtering medium be readily replaceable or subject to continuous change if necessary, and that any support for the filtering medium be simple and efficient in operation and maintenance.

It is with these and other problems and desiderata in mind, that the present means have been evolved, means providing a simple, efficient drum filter in which the filtering medium may readily be replaced as it becomes soiled; and in which the mounting of the filtering medium with respect to the drum is of a simple expeditious nature having a minimal number of moving parts.

It is accordingly a primary object of this invention to provide a novel drum filter in which substantially controlled change of the filtering medium may readily be accomplished.

Another object of this invention is to provide a drum filter in which there is a minimal possibility of the gaseous media being filtered by-passing the filtering medium.

A further object of the invention is to provide an improved mounting for a filtering medium with respect to a drum filter.

Another object of the invention is to provide a filtering medium mounting permitting ready replacement of soiled filtering medium.

It is also an object of the invention to provide a filtering medium mounting permitting substantially continuous replacement of soiled filtering medium at any desired rate, whereby the rate of replacement of the filtering medium may be coordinated with any rate of filter soilage.

An additional object of the invention is to provide an improved means for dispensing a filtering medium over a drum filter and removing soiled filtering medium.

These and other objects of the invention which will become hereafter apparent are achieved by provision of novel mounting means in the form of a carriage arranged to ride over the surface of a drum filter having a foraminous cylindrical wall for the admission of a gaseous medium and an exhaust duct for discharge of the purified medium. Supported on the carriage are dispensing means from which the filtering medium is dispensed over the foraminous wall of the drum filter. These dispensing means comprise a roll or reel upon which a sheet filtering medium such as filter paper or the like is wound. Take up means are mounted on the carriage comprising a reel upon which soiled filtering medium may be taken up. The carriage is so arranged with respect to the drum filter that upon movement of the carriage over the foraminous cylindrical wall thereof, the dispensing reel will be rotated to dispense the filter paper over the foraminous wall, and simultaneously the take up reel will be rotated to take up the soiled filter paper from the surface of the filter wall.

An important feature of the invention resides in the fact that the novel arrangement for supporting the filtering medium dispensing means, and the take up means permits substantially continuous or intermittent replacement of soiled filtering medium at any desired rate.

Another feature of the invention resides in the fact that movement of the carriage may be controlled by any power source whose energization may readily be coordinated with means for detecting filter soilage, time, or any other desired factor.

The specific details of the invention, and their mode of functioning will be made most manifest and particularly pointed out in conjunction with the accompanying drawings, wherein:

FIG. 1 is an axial section through a schematic view of the drum filter of one construction; and FIG. 2 is a cross-section through a part of the drum filter and the revolving carriage showing a carriage end plate; and FIG. 3 shows schematically a partial view of another embodiment of the drum filter with a modified arrangement of the reel of filter material.

Referring now more particularly to the drawings, like numerals in the various figures will be employed to designate like parts.

As best seen in FIG. 1, the drum filter is shown mounted on the floor 1, by means of a stand 2 which fixedly supports the drum 3 by engagement therewith at end wall 4. The opposite end wall 5 has a central opening 6 from which an exhaust duct 7 extends. Duct 7, as seen to the right in FIG. 1, is arranged to extend through a wall 8 which as seen in the drawing serves to support the end of the drum 3, opposite stand 2. The wall 8 also serves to separate areas containing the unpurified gaseous medium from areas to which purified gaseous medium is fed. Thus in an air conditioning installation, it will be understood that the area to the right of the wall 8 in FIG. 1 is the conditioned area as opposed to the area to the left which may be regarded as in communication with the ambience.

On opposed faces of end walls 4 and 5, rings 9 and 10 are secured. Connecting members 11 extend between these rings, and a cylindrical foraminous grid, or screen, of sheet metal or the like is supported on the rings 9 and 10 and connecting members 11 to form the foraminous cylindrical wall of the filter drum for the admission of a gaseous medium to the interior of the drum.

A carriage 21 as seen in FIGS. 1 and 2 is arranged to move over the cylindrical wall of the drum filter. Carriage 21 is provided with rollers 14 (on the left in FIG. 1) and rollers 15 (on the right in FIG. 1) which ride on the rims of end walls 4 and 5 respectively. In the embodiment of the invention illustrated in FIGS. 1 and 2, two rollers are provided for each end plate 19 of the carriage. Each of rollers 14 and 15 are rotatably mounted on one end of a first class lever 16 and 17, respectively, fulcrumed on pivot pins 18 secured in end plates 19 and 20 of carriage 21. The other ends of levers 16 and 17 are engaged by tension springs 22 anchored in the end plates 19 and 20 so as to bias rollers 14 and 15 against the rims of end walls 4 and 5. End plates 19 and 20 are rigidly interconnected by tie rods 23 as seen in FIG. 1.

Angle member 24 extends laterally from carriage 21 and supports annular ring 26 which is arranged at a spaced distance from the outer side of end wall 4 concentrically with filter drum 3. Ring 27 is also supported on the carriage as shown in FIGURE 1. Rollers 14' and 15' are rotatably mounted on the rings 26 and 27 respectively (as best seen at the lower part of FIG. 1) to facilitate rotation of the carriage on the drum.

Dispensing reel 28 is rotatably mounted on carriage 21 as best seen in FIG. 2, as is take up reel 29. The filtering medium which in the illustrated embodiment is to be taken as filter paper is indicated at A and is wound on dispensing reel 28 trained over guide roll 30 which guides the filter paper A around the periphery of screen 12, and after encircling the latter is taken up on take up reel 29. It will be observed from FIG. 2 that reel 28 is mounted for rotation about a fixed axis while the journals 31 of take up reel 29 are yieldingly mounted in guide grooves 32 containing spring 33. Spring 33 is a tension spring engaging journal 31 and the lower end of groove 32 so as to normally bias take up reel 29 into peripheral contact with the screen or grid 12.

Guide roll 30 is mounted at each end in one arm of a first class lever 34 (similarly to the previously described mounting of rolls 14). Levers 34 are fulcrumed for pivotal movement one on each end plate 19, and 20, respectively, and the lever arm opposite to the one upon which roll 30 is rotatably mounted is acted on by tension spring 35 which is anchored in the end plate to which the lever is pivoted.

Sealing roll 36 as best seen in FIG. 2 is rotatably mounted between end plates 19 and 20 and is formed of a compressible material such as rubber, neoprene, or the like so that it may be compressed as the filter paper A builds up on take up reel 29. Spring 37 normally biases sealing roll 36 towards guide roll 30. It will be understood that the diameter of sealing roll 36 is such as to extend from the periphery of guide roll 30 into contact with the filter paper on take up reel 29.

Means for effecting carriage movement are provided by forming a U-shaped peripheral groove in ring 27 (to the right in FIG. 1) within which a sprocket chain 38 is secured. A driving motor 39 causes rotation of toothed wheel 40 arranged to mesh with sprocket chain 38. As is apparent, the rotation of toothed wheel 40 causes rotation of ring 27 so that carriage 21 revolves around the drum 3 on its rollers 14 and 15.

It is desirable that reel 28 be arranged as close as possible to guide roll 30 so that the inside surface of the filter paper being dispensed from reel 28 is not contaminated by impurities in the medium being filtered.

In the embodiment of the invention illustrated in FIG. 3, an arrangement of the dispensing reel, guide roll, sealing roll and take up reel is shown which permits substantial surface to surface contact between the dispensing reel 28 and guide roll 30 so that the inside surface of the filter paper is not exposed to contamination by the air to be cleansed as it unwinds from reel 28.

As seen in FIG. 3, this is accomplished by arranging dispensing reel 28 with respect to guide roll 30 at a point substantially diametrically opposed to drum 3. It will be observed that in the illustrated arrangement, if mutual contiguity may be obtained between dispensing reel 28, take up reel 29, and guide roll 30, then it may be possible to eliminate sealing roll 36.

*Operation*

The aforedescribed drum filter structure may obviously be utilized in a variety of situations where filtering action is desired. It is contemplated however that primary utility will be found in connection with an air conditioning installation where it is desired to filter the air passing through the air conditioning system. Where this air passing into the air conditioning system is replacement air, the drum filter 3 is arranged in communication with the ambience from which the replacement air is drawn, and exhaust duct 7 is connected to the intake of the air conditioning equipment, so that an air stream is set up in the direction of the arrows illustrated in FIG. 1 from the ambience through the foraminous cylindrical wall of drum 3 and out through duct 7.

Energization of motor 39 in response to any desired control which may be either manual, or automatic in response to any desired factor such as time, filter contamination, or the like, effects movement of carriage 21 over the cylindrical wall of the drum. It will be apparent that rotation of sprocket wheel 40 in engagement with sprocket chain 29, which has a driving connection with ring 27 causes carriage 21 to move. As the carriage moves over the surface of the drum, feed roll 30 in contact with grid 12 is caused to rotate whereby filter paper A is drawn from dispensing reel 28 and deposited on the surface of the drum over grid 12. Simultaneously, reel 29 set into rotation as a result of its peripheral contact with the surface of drum 3 takes up the soiled filter paper previously deposited on the drum surface.

When the drum filter is operating, contaminated air is extracted from the space surrounding the filter by a fan (not shown) connected to the exhaust duct 7, and as the air passes through the filter paper A in the direction of the arrows 41, the impurities are separated out and deposited on the filter paper. The purified air which accumulates in the space 13 is then discharged in the direction of the arrows 42 through the exhaust duct 7.

The movement of the carriage is effected in accordance with the soiling of the filter paper and can take place periodically, or continuously at relatively low speed. In operation, the sealing roller 36 bearing on both the roller 30 and the reel 29 prevents the passage of air through that surface between the roller 30 and the reel 29 which is not covered by filter material.

Instead of initiating the movement of the carriage over the drum wall at certain time intervals, it is also possible, by determining the pressure drop in the flow of the air through the filter, to cause renewal of the filter paper A when the pressure drop exceeds a certain value.

If desired, certain parts of the filter surface may easily be made ineffective by providing an unperforated sheet metal wall at these places instead of a perforated plate.

It is also contemplated that instead of using a filter material which has to be replaced after passing through once, a material may be employed which can be repeatedly used, in which case cleaning means must be provided. In such a case, it is possible by reversing the direction of movement of the carriage for the latter to unwind the section which has been cleaned and to clean the used section on taking up the latter.

It is thus seen that a simple efficient mounting has been provided for dispensing a filtering medium over the foraminous wall of a drum filter in which contaminated or soiled filtering medium may be removed at any desired rate.

The above disclosure has been given by way of illustration and elucidation, and not by way of limitation, and it is desired to protect all embodiments of the herein-disclosed inventive concept within the scope of the appended claims.

What is claimed is:

1. In a drum filter having a foraminous cylindrical wall for the admission of a gaseous medium and an exhaust duct for discharge of the purified medium, means for providing a filtering medium over the foraminous cylindrical wall said means comprising: dispensing means from which the filtering medium is dispensed over the foraminous wall; take up means receiving soiled filtering medium; and mounting means movably supporting said dispensing means and said take up means for movement over the cylindrical wall to dispense clean filtering medium as soiled filtering medium is taken up.

2. Means as in claim 1 in which: driving means are coupled to said mounting means for moving same over the cylindrical wall of the drum filter.

3. Means as in claim 1 in which said mounting means are positioned for movement over the cylindrical wall with roller means providing rolling friction between said mounting means and the wall.

4. Means as in claim 3 in which resilient means connect said rolling means to said mounting means.

5. Means as in claim 3 in which guide means are provided on the end walls of the drum filter projecting beyond the cylindrical wall diameter, over which said roller means are trained.

6. A method for providing a filtering medium over the foraminous cylindrical wall of a drum filter, said method comprising the steps of: mounting a source of filtering medium for movement over the foraminous wall along with take up means for soiled filtering medium; moving the source of filtering medium and the take up means over the foraminous wall; dispensing the filtering medium over the foraminous wall; and taking up soiled filtering medium as required.

7. A method as in claim 6 in which said moving step is accomplished by means of a selectively energized drive motor.

8. A method as in claim 6 in which said moving step is accomplished with rolling friction over the surface of the foraminous cylindrical wall of the drum filter.

9. A method as in claim 6 in which said moving step is accomplished by: guiding the source of filtering medium and the take up means along the periphery of the end walls of the drum filter.

10. In a drum filter having a web of filter material which at least partially surrounds a foraminous wall surface of said filter, which material is unwound from a dispensing reel and is wound onto a take up reel, the wall surface and the filter web supported thereon being at rest relative to one another: a movable carriage rotatably mounting the dispensing reel and take up reel; means mounting said carriage for movement over the foraminous wall of the drum, the reels being rotatably mounted in said carriage and having a driving connection with the drum.

11. In a drum filter as in claim 10: a plurality of rollers rotatably mounted to movably support said carriage for movement over the foraminous wall of the drum.

12. In a drum filter as in claim 11: resilient mounting means supporting said rollers with respect to said carriage.

13. In a drum filter as in claim 10: guide ways formed by the rims of the end wall of the drum filter, said guide ways projecting beyond the drum diameter and guiding said carriage for movement.

14. In a drum filter as in claim 10: driving means operatively connected to said carriage for moving same over the foraminous wall of the drum.

15. In a filter as in claim 10: a driving ring secured to said carriage; and an electric motor in driving connection with said ring for causing rotation thereof with resultant movement of said carriage over the foraminous wall of the drum.

16. In a drum filter as in claim 15, in which the driving connection between said driving ring and said electric motor is effected by means of: sprocket chain secured to said driving ring; and a sprocket wheel coupled to said motor in engagement with said sprocket chain.

17. In a drum filter as in claim 10: a guide roll supported on said carriage over which the filter web is guided from the dispensing reel to the foraminous wall of the drum.

References Cited in the file of this patent

FOREIGN PATENTS 771,867     Great Britain _____ Apr. 3, 1957